(No Model.)
F. F. RAYMOND, 2d.
SPRING HEEL BLANK.
No. 354,227.   Patented Dec. 14, 1886.
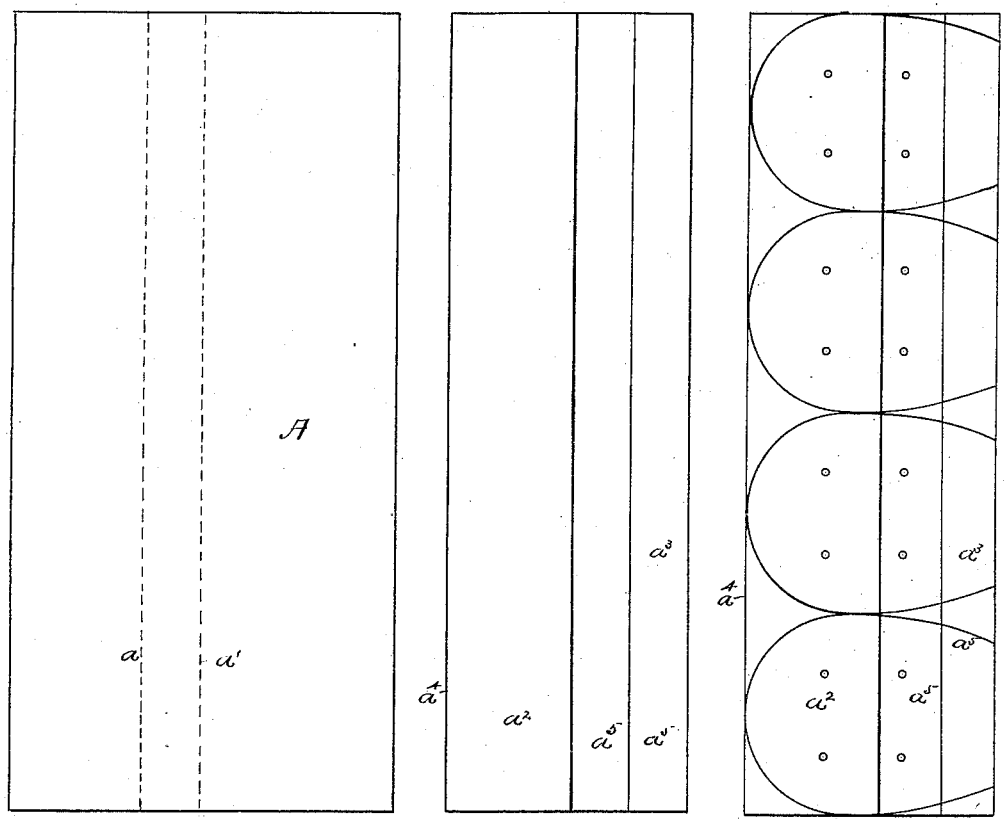
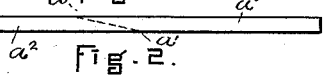 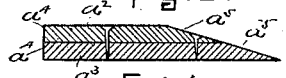 
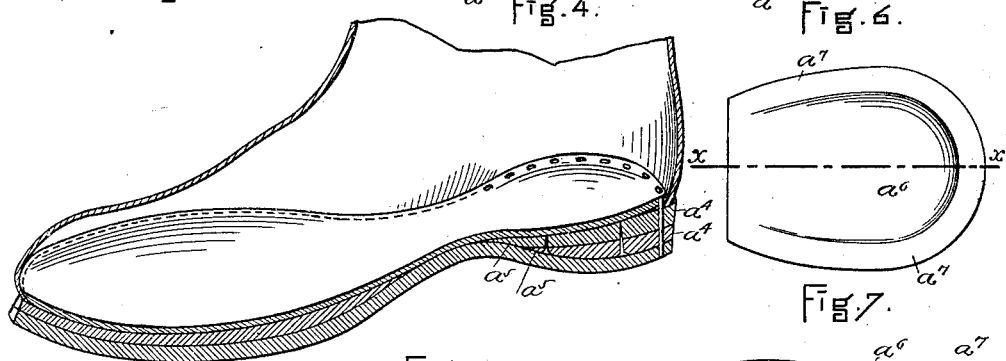
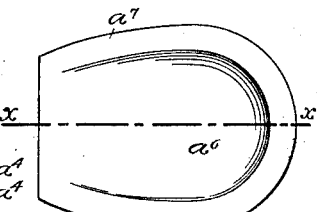
WITNESSES
J. M. Dolan
Fred. B. Dolan
INVENTOR.
F. F. Raymond 2d.

UNITED STATES PATENT OFFICE.

FREEBORN F. RAYMOND, 2D, OF NEWTON, MASSACHUSETTS.

SPRING-HEEL BLANK.

SPECIFICATION forming part of Letters Patent No. 354,227, dated December 14, 1886.

Application filed May 13, 1886. Serial No. 202,106. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Spring-Heel Blanks, of which the following is a full, clear, and exact description, reference being had to the accompanying drawings, forming a part of this specification, in explaining its nature.

My invention relates to a method of making spring-heel blanks, consisting in cutting the stock of which the blanks are made into long strips, and then dividing the strips by a diagonal cut or slit, then uniting the two strips so as to bring their inclined edges substantially on a line with each other, then uniting the strips together by glue, cement, metal fastenings, or in any other desired way, and then cutting or dieing from this prepared strip the spring-heel blank. It was described originally in my application filed January 14, 1886, for which a patent was granted April 20, 1886, No. 340,358. The product is also described in Patent No. 342,461.

Referring to the drawings, Figure 1 is a plan view of the strip of stock from which the blank is made, representing in dotted lines the line upon which it is cut or separated into two parts. Fig. 2 is an end elevation of said strip. Fig. 3 represents the two parts or sections of the strip after they have been cut and placed one upon the other and united by metal fastenings. Fig. 4 is a vertical section through the same. Fig. 5 is a plan view of said prepared strip, showing the form of the separate spring-heel blanks cut or dinked therefrom. Fig. 6 is a vertical section thereof. Fig. 7 represents the ball as shaped by suitable molds to provide a heel-seat. Fig. 8 is a cross-section upon the line $x\ x$ of Fig. 7. Fig. 9 is a vertical section of a spring-heel shoe.

A represents a strip of stock, preferably of leather. It is cut to a width sufficient to provide the two lifts hereinafter prescribed and of a length to provide for the cutting of a number of lifts therefrom without waste. This strip A is divided or separated into two unequal parts by a diagonal cut extending from the line or point $a$ to the line or point $a'$, thereby forming the two strips $a^2\ a^3$, each of which has the straight edge $a^4$, and the inclined or skived edge $a^5$. The strip $a^3$ is wider than the strip $a^2$. The strip $a$ is then placed upon the strip $a^3$, substantially as shown in Figs. 3 and 4, to bring the straight edges $a^4$ together and the inclined or skived edges $a^5$ together, as shown in said figures, and they are secured to each other by glue, paste, cement, sewing, metallic fastenings, or in any other desirable way. The strip may then be submitted to the operation of suitable forming-dies, whereby the line of concave sections corresponding to the heel-seat of the finished blanks is made; or it may be submitted to a dinking or dieing machine for dinking or cutting out the heel-blanks therefrom; and in Fig. 5 I have represented the line upon which said cutting-die or dinking device will operate, the strip being represented as long enough to make four heel-blanks.

If the heel-seat has not been formed by molding in the strip, as before described, it may be formed in the heel-blank, either by molding or by removing a portion of the upper surface of the heel-blank; and in Figs. 7 and 8 I have represented the spring-heel blank as molded to form the seat-cavity $a^6$. This cavity is surrounded by the straight section or surface $a^7$. It is not always necessary that the heel-blank be thus shaped, as a great deal depends upon the shape of the last upon which the shoe is made. If a flat last is used, it will be necessary to provide the spring-heel blank with a formed heel-seat. If a last considerably rounded at the heel is used, then it will be necessary or desirable to provide the blank with the heel-seat.

The strip A may be formed of leather, or of any other suitable material; or one of the strips $a^2\ a^3$, preferably $a^3$, may be formed of other material than leather.

In use the spring-heel blank is placed between the insole and the outsole, the upper surface of the lift $a^3$ being uppermost or next the under surface of the insole, and it is united to the insole, preferably, by a gang or group of metal fastenings driven through the outsole into the insole.

The advantages of the invention arise from the facility and cheapness with which blanks can be made, and also from the facility with which they can be used in the manufacture of boots and shoes. Heretofore it has been the custom to build the heel upon the insole by first placing one lift thereon and securing it, then the next lift, and then the outsole, a slow and expensive method.

It is obvious that the diagonal cut may be of such a nature as to provide two parts made from the strip A with edges which shall be more or less inclined, according to the shape which it is desired that the complete spring-heel blank shall have; also, that the location of the cut in relation to the edges of the strip may be varied to vary the width of the two parts $a^2$ $a^3$ made therefrom.

Of course, in practicing the invention the strips $a^2$ $a^3$ may be formed from separate strips or pieces—that is, it is not necessary that they be cut from one piece of stock by the diagonal slit; but they should each have skived or inclined edges and each bear such relation to each other as to width that the inclined edges, when they are placed, shall be brought substantially in line, as represented in Figs. 3 and 4.

Having thus fully described my invention, I claim and desire to secure by Letters Patent of the United States—

1. The method of manufacturing spring-heels, consisting in taking a strip of stock of the required dimensions, dividing it by the diagonal cut into two parts, placing one part upon the other to bring the diagonal edges in line, uniting said superimposed parts, and cutting or dinking therefrom the complete spring-heel blank, all substantially as described.

2. The improvement in the art of manufacturing spring-heels, consisting in forming two strips having skived or diagonal edges $a^5$, placing one upon the other to bring the skived or inclined edges substantially in line with each other, fastening the two superimposed strips together, and cutting or dinking therefrom a spring-heel blank, all substantially as described.

FREEBORN F. RAYMOND, 2D.

Witnesses:
J. M. DOLAN,
FRED. B. DOLAN.